3,451,724
**METHOD AND MEANS FOR UNLOADING BULK
TRANSPORTED PULVERULENT MATERIALS**
Joseph A. Cappelli, Old Bridge, Antonio P. Guattery, and
 Edward Rebar, Metuchen, and George Sobin, Kenilworth, N.J., and George L. Becht, New York, N.Y.;
 said Becht assignor to ACF Industries, Incorporated,
 New York, N.Y., a corporation of New Jersey, said
 Cappelli, said Guattery, said Rebar, and said Sobin
 assignors to National Lead Company, New York, N.Y.,
 a corporation of New Jersey
    Filed July 12, 1967, Ser. No. 652,847
              Int. Cl. B65g 53/04
U.S. Cl. 302—14                                         8 Claims

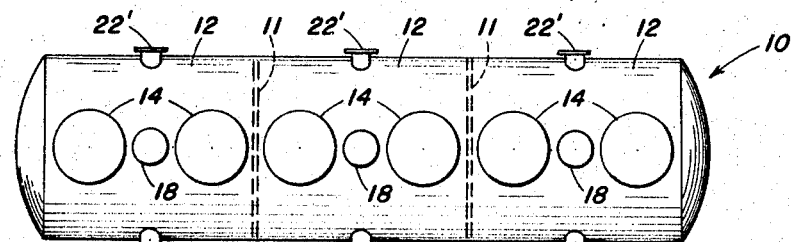
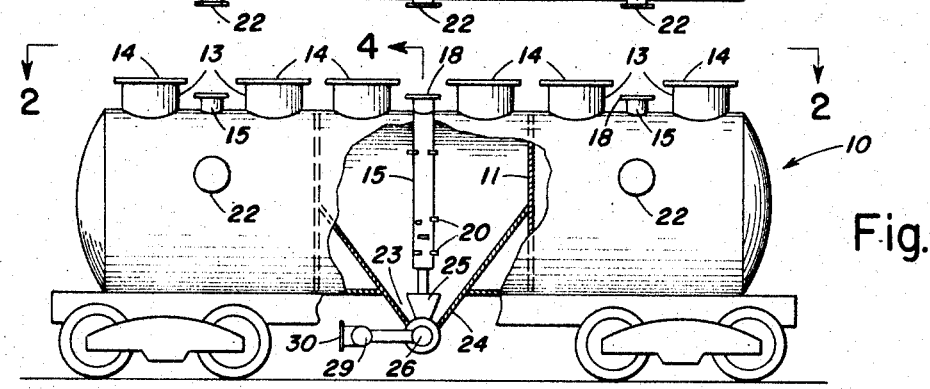
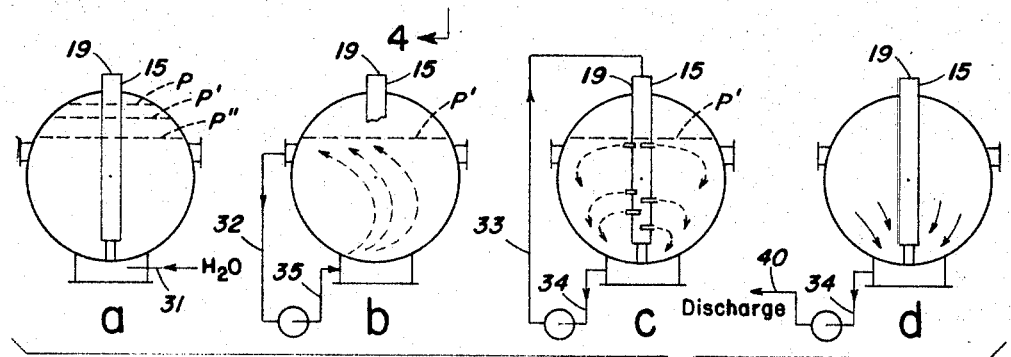
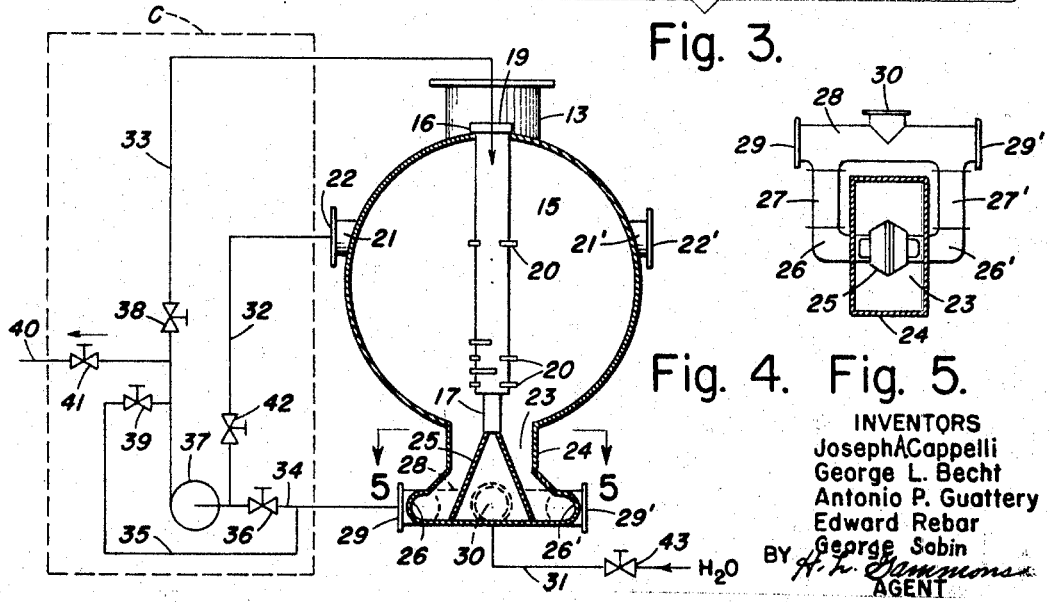

ABSTRACT OF THE DISCLOSURE

The present invention relates to the unloading of dry pulverulent materials from a railroad tank car or automotive tank truck at its point of destination by introducing a liquid into the tank to form a solution or slurry which is pumped from the tank into the consumers storage facilities.

Background of invention

The invention would appear to relate to the field of art classified in the Patent Office in Class 214—Material or Article Handling.

A preliminary search of the pertinent art has uncovered the following U.S. patents which are deemed to be of interest: U.S. 2,143,273—Method and Apparatus for Transporting and Handling Materials—Ladd— Jan. 10, 1939; U.S. 2,505,194—Shipment of Calcium Chloride in Tank Cars—Loss—Apr. 25, 1950; U.S. 2,827,185—Apparatus for Transporting and Handling Materials—Feigin—Apr. 18, 1958.

As seen from the prior art patents the provisions for transporting and unloading equipment for handling bulk materials, and in particular pulverulent materials, in a manner to reduce labor and bagging costs and to facilitate unloading has been explored heretofore. In general this earlier equipment has comprised railroad tank cars equipped with spargers and/or agitators for effecting a thorough mixing of the liquid and pulverulent materials prior to discharging the resulting solution or suspension from the tank. These devices have several disadvantages, the principal one being the installation within the tank car of complex and costly piping, conveyer screws and similar agitating devices with their attendant maintenance cost, malfunctioning and the like. Moreover although this type of equipment has had the limited use unloading soluble materials it has been found to be undependable for handling materials which form suspensions or slurries. Materials of this type, notably $TiO_2$ pigmentary material, not only produce "icebergs" i.e. large chunks of floating material, but are also subject to dilation, a phenomenon which accompanies any mechanical displacement of a high solids content slurry causing partial solidification of the slurry.

The present invention eliminates the aforesaid disadvantage of prior art devices and in particular provides a dependable and economical method and means for unloading both soluble and insoluble pulverulent materials from transportation tanks.

As herein used the words "soluble material" are intended to include not only materials which dissolve in liquid to form true solutions, but also any material which may be suspended in a liquid to form a suspension or slurry. Similarly the word "solution" as hereinafter used shall be understood to include suspensions and slurries.

Summary of the invention

The present invention provides a transportable tank, such as a railroad tank car or automotive tank truck, with suitable inlets and outlets to which conduits of a conduit-complex located at the unloading area and not constituting a permanent part of the tank, are detachably connected for discharging the contents of the tank quickly and efficiently into a consumers storage tank or process lines.

The conduit-complex includes conduits, preferably though not necessarily flexible, adapted to be connected to the inlets and outlets of the tank, a centrifugal pump for circulating solution through the conduits and tank, and manually operated valves adapted to control the circulation of the solution according to a predetermined pattern so as to produce a homogeneous solution in the tank before discharging the solution therefrom. To this end the setting of the valves is such that at the outset a relatively dilute solution is withdrawn from the upper level of the tank and pumped into the bottom of the tank in a continuous cyclic operation. Thereafter the valves are adjusted so as to pump the solution from the bottom of the tank back up into the top thereof from whence it is discharged into the main body of solution in the tank. After maintaining this recycle operation for a period of time sufficient to insure a homogeneous solution the valve settings are again adjusted so as to break the recycle and cause the homogeneous solution to be discharged from the bottom of the tank into the customers storage tank or directly into his process lines as the case may be.

Brief description of the drawings

FIG. 1 is a side elevation of a railroad tank car suitably altered to practice the present invention;

FIG. 2 is a plan view of the tank car of FIG. 1;

FIG. 3 is a diagrammatic representation of the cyclic-recycle method of this invention for discharging a solution of pulverulent material from a compartment of the tank car;

FIG. 4 is an enlarged cross section of the tank car on line 4—4 of FIG. 1 including a schematic diagram of the conduit complex coupled thereto; and FIG. 5 is a plan view on line 5—5 of FIG. 4, showing details of the under-carriage component for introducing fluid into and withdrawing it from the bottom of the tank.

Preferred embodiment of the invention

The drawings illustrate the preferred embodiment of the invention wherein FIGS. 1 and 2 show a railroad tank car 10 having the usual bulkheads 11—11 for dividing the interior of the tank car into three substantially identical compartments indicated at 12—12—12. The present invention is adapted to be used with each compartment 12 of the tank car each of which has two relatively large openings or loading domes 13—13 to the top thereof for loading a pulverulent material into the compartment, each dome having a hinged cover 14.

Supported within the center of each compartment is a standpipe 15 which, as shown in FIG. 4, is held in a vertical position within its respective compartment by a coupling 16 at the top of the standpipe and an insert sleeve 17 at the bottom thereof, said sleeve being adapted to rest on the upper edge of a deflector hereinafter described. Each standpipe 15 is provided with a cover 18 which is kept on when pulverulent material is being loaded into its compartment—but which is removed to provide an inlet 19 for introducing a liquid into the top of the compartment when unloading the tank car. In this connection each standpipe 15 is adapted to carry liquid down into the interior of its respective compartment to a point adjacent the bottom thereof, and there to discharge the liquid via a plurality of jet apertures or nozzles 20 into the main body of pulverulent material in the compartment to facilitate mixing the dry and wet components in the tank. The jet apertures or nozzles 20 may extend radially from the standpipe but are preferably arranged tangentially so as to impart circulatory motion to the components in the tank thereby both to scour the walls and create effective agitation within the tank. Moreover the nozzles 20 are not all in one horizontal plane, but are arranged in a plurality of horizontal planes spaced vertically up and down the lower end of the standpipe. And further, a supplementary set of nozzles 20 is provided on the standpipe about half-way down from the top of the tank for breaking up any large lumps of dry material that may float on top of the solution in the tank.

Outlet apertures 21 and 21' are provided in opposite sides respectively of each compartment of the tank at points above its half-way mark but below the top thereof, each outlet having a cover 22–22' which, for unloading the tank, is removed to accommodate a pipe or conduit which is adapted to be detachably secured therein conveniently and with dispatch by suitable fastening-means.

Referring especially to FIGS. 1 and 4 the bottom of each compartment is shown as having converging walls which terminate in a central bottom aperture 23.

Secured to the underside of the tank directly below the bottom aperture 23 of each compartment and in communication therewith through a plurality of passages is an undercarriage component designed to introduce a liquid or solution into the bottom of the compartment or to withdraw it therefrom, as the case may be via the bottom aperture 23. The bottom aperture 23 thus serves both as an inlet and an outlet. The undercarriage component comprises two members the one being a trough-shaped throat 24 provided at its center with a substantially wedge-shaped deflector 25 which is arranged to project upwardly into the bottom aperture 23 of the compartment as and for the purpose hereinafter described; the other member being a substantially rectangular pipe-manifold. As shown especially well in FIG. 5 the pipe-manifold comprises pipe elbows 26–26' connected into the trough-shaped throat 24 at opposite ends thereof respectively; and pipe nipples 27–27' extending from each of the elbows 26 to the opposite ends respectively of a pipe main 28. Each end of the pipe main 28 is, in turn, provided with a fitting 29–29' for detachably connecting a conduit thereto as and for the purpose described below. A similar fitting 30 is provided in the pipe main 28 intermediate its opposite ends.

As mentioned above the trough-shaped throat 24 with its pipe-manifold provide means for introducing a liquid into or withdrawing it from the tank via its bottom aperture 23 and in this connection it has been found that by having the wedge-shaped deflector 25 projecting up into the bottom aperture 23 of the tank any tendency of the dry pulverulent material to form a solid plug in the aperture 23 is minimized. Moreover when fluid is pumped up into the bottom aperture 23 via the pipe manifold and throat 24 it impinges against the sloping sides of the deflector 25 and is deflected upwardly through the bottom aperture 23 at relatively high velocities thereby effecting maximum agitation of the pulverulent material and/or solution, as the case may be, in the immediate vicinity of the bottom aperture 23—as a consequence of which the latter is always maintained open and free of plugging.

As will be evident from the drawing the tank is preferably provided with inlet and outlet openings on both sides. This is especially important when the tank is a railroad tank car for this construction permits the conduits of the conduit complex to be readily connected to the tank car irrespective of which end of the tank car enters the unloading area first.

Referring to the FIGS. 3 and 4 the latter in particular, illustrates, schematically, the conduit complex C which is located at the unloading area of the railroad tank car for unloading the latter by the surprisingly quick and efficient method of this invention. Only one conduit complex C is shown in the drawings and only one complex is required provided each compartment of the tank car is unloaded in succession. However it is within the purview of the invention to provide three such complexes at the unloading area so that all compartments of the tank car may be unloaded simultaneously. Each conduit complex C comprises, in general, a plurality of conduits, preferably though not necessarily flexible, adapted to be detachably connected to the aforesaid inlets and outlets of each compartment of the tank car; pumping-means for pumping a solution through the conduits and into the tank compartment in a predetermined cyclic pattern, and a series of valves, preferably though not necessarily manually operated, at selected points in the conduits of the complex for directing the flow of solution therethrough according to a predetermined cyclic pattern.

More particularly, having reference to FIG. 4 the latter shows, diagrammatically, the conduit complex C and its connections to a tank car. Thus conduit 32 of the conduit complex C is connected to outlet 21 or 21', as the case may be, in the side of one of the compartments of the tank; conduit 33 is connected to inlet 19 at the top of standpipe 15 in the compartment and conduit 34 is connected to the fitting 29 or 29' as the case may be, of the pipe-manifold. A by-pass conduit 35 of the conduit complex is connected to the conduit 34 between fitting 29 of the pipe-manifold and a valve 36, its opposite end being connected to the conduit 33 at a point between a centrifugal pump 37 and valve 38 in the conduit 33. A valve 39 is located in the by-pass conduit 35 just in front of its connection to the conduit 33. A discharge conduit 40 is connected at one end of the conduit 33 between its valve 38 and the connection of the by-pass conduit thereto and is provided with a valve 41. The conduit complex also includes a valve 42 in the conduit 32 immediately in front of its connection to conduit 34.

In addition to the conduits of complex C a conduit 31 is provided at the unloading area for delivering a liquid into the tank preparatory to unloading, the conduit 31 being adapted to be connected at one end to the fitting 30 of the pipe-manifold secured to the underside of the tank; and at its other end to a source of liquid (not shown). A valve 43 is provided in the conduit 31 for controlling the flow of liquid therethrough.

As mentioned at the outset when transporting a pulverulent material by tank car or truck it is subjected to constant vibration as a consequence of which it settles in the tank. This is illustrated in FIG. 3 of the drawing, by the dotted lines P, P' and P'' the uppermost line P being indicative of the original level of the pulverulent material in the tank and the line P' that following transit.

Assuming the above described conduit connections have been made to a compartment of a tank car then the compartment is emptied of its pulverulent material in a series of steps which are illustrated in FIG. 3 of the drawing. At the outset all of the valves of the conduit complex C are closed; then, assuming the customer wishes a solution of predetermined concentration or a slurry of predetermined solids content, valve 43 of conduit 31 is opened and the total amount of liquid required to make a solution or slurry to specifications is pumped into the compartment via the pipe manifold. As explained above due to the presence of the deflector 25 in the bottom aperture 23 of the compartment the liquid stream flows upwardly there through at high velocity thereby breaking up and/or dislodging any packed material in the aperture—and rapidly percolates upwardly through the pulverulent material saturating it and causing it to settle from level P' (at end of transit) to a new level P''. A solution of very high concentration will be formed at the bottom of the compartment while a layer of solution or slurry, more dilute than specified by the customer will be formed at the top of the material at level P". After all of the liquid has been pumped into the compartment valve 43 is cloesd and then valves 42 and 39 are opened and centrifugal pump 37 started so as to withdraw the relatively dilute solution or slurry from the compartment via outlet 21 and pump it into the bottom of the compartment via the pipe- manifold in a continuous cyclic operation as indicated by the dotted flow lines in FIG. 4b. This cyclic flow of dilute solution is continued until substantially all of the pulverulent material in the bottom of the compartment has been brought into solution. Generally, however, this solution will be a non homogeneous and somewhat below specifications.

Thereafter valves 39 and 42 are closed, and valves 36 and 38 are opened whereupon solution is withdrawn from the bottom of the compartment via the pipe-manifold up into the top of the compartment via conduit 33 from which it is discharged into the open upper end 19 of standpipe 15. From thence the solution flows down through the standpipe 15, as shown in FIG. 4c, and is discharged from the bottom thereof through nozzles 20 at a point adjacent the bottom of the compartment. This recycle of the solution is continued until all of the solution in the compartment comprises a homogeneous mixture of the specified concentration. When this has been accomplished valve 41 is opened and valve 38 closed, in this order, whereupon the homogeneous solution of specified concentration is pumped from the tank car via conduit 40 directly into the customers storage tank or into his process lines, as the case may be.

The following example will serve to further illustrate the invention. In this case a railroad tank car was used of standard design but modified to embody the inlets and outlets hereinabove described. Each compartment of the tank car was loaded with 15.22 tons of dry $TiO_2$ and the car then sent to the destination where the customers had installed a conduit complex C for unloading the car. The flexible conduits of this complex had an I.D. of 4 inches, the several valves were manually operated gate valves of standard design and the pump was 4 x 3 centrifugal pump having a capacity of from 3–350 g./min. and driven by a 30 H.P. motor. Upon arrival of the car the flexible conduits of the conduit complex C were attached to one compartment of the car in the manner aforesaid whereupon 2387 gallons of water were pumped into the bottom of the compartment, this amount of water being required to form an aqueous slurry having a specified solids content of 60%. Had a solution of higher percent solids been desired the amount of water added would have been reduced. Following addition of the water a relatively dilute layer of slurry of about 45% solids had formed on top of the bulk of the $TiO_2$ in the compartment while a non-homogeneous slurry of about 80% solids was detected in the bottom of the compartment. Thereafter the cyclic operation hereinabove described was started whereby the relatively dilute slurry was withdrawn from the side outlet and pumped into the bottom of the compartment via the pipe-manifold until substantially all of the slurry in the compartment had reached a solids content of 55%. This slurry was then recycled into the top of the compartment as hereinabove described until the solids content of all of the slurry in the compartment was up to specification, i.e. 60% solids after which the slurry was pumped directly into the customers storage tank.

The time required for unloading the one compartment of the tank car, i.e. 15 tons of $TiO_2$ was one hour and the entire operation was done without experiencing any plugging in the conduits and or stoppage due to dilation, "icebergs" and similar problems encountered by slurry cars heretofore known and used.

While this invention has been described and illustrated by the examples shown, it is not intended to be strictly limited thereto, and other variations and modifications may be employed within the scope of the following claims.

We claim:
1. Apparatus for unloading a dry pulverulent material contained in a transportable tank having a relatively large opening in the top thereof for loading said pulverulent material therein, and an opening in the bottom thereof said apparatus comprising in combination: a pipe-manifold secured to the underside of said tank having passages in communication with the bottom opening thereof, a conduit arranged to be detachably connected to said pipe-manifold for injecting a liquid into said tank via said bottom opening to mix with said pulverulent material and form a solution therein, an outlet in the side of said tank at a point above the half-way mark but below the top of said tank, and inlet in the top of said tank, each of said outlet and said inlet and said pipe-manifold having means for detachable connecting a conduit thereto, and a conduit complex, independent of said tank but adapted to be connected thereto, said complex comprising conduits detachably connected, respectively, to the pipe-manifold, to the outlet in the side of said tank and to the inlet in the top of said tank, said conduit complex also including a discharge conduit, pumping means arranged to pump said solution through said conduits into and from said tank, and valves arranged to be operated in predetermined sequence to cycle said solution through said conduits first from the side outlet in said tank into the bottom aperture of said tank via said pipe-manifold, then to recycle the solution from within said tank to the inlet in the top of said tank via said pipe-manifold, and thereafter to discharge the solution from said tank via said pipe-manifold and said discharge conduit.

2. Apparatus for unloading a dry pulverulent material contained in a transportable tank according to claim 1 wherein the conduits of said conduit complex are flexible.

3. Apparatus for unloading a dry pulverulent material according to claim 1 wherein said transportable tank is a railroad tank car.

4. Apparatus for unloading a dry pulverulent material according to claim 1 wherein said transportable tank is an automotive tank truck.

5. Apparatus for unloading a substantially dry pulverulent material contained in a transportable tank having a plurality of compartments each compartment having at least one relatively large opening in the top thereof for loading the pulverulent material therein and an opening in the bottom of each compartment, said apparatus comprising in combination: an undercarriage component secured on the underside of the tank opposite the bottom opening of each compartment, each undercarriage component comprising a pipe-manifold-and-throat assembly having passages in communication with the bottom opening of its respective compartment and deflector-means in each throat arranged to extend upwardly into the bottom opening of its respective compartment, a conduit arranged to be detachably connected to each pipe-manifold for injecting a liquid into its compartment via its bottom opening to mix with said pulverulent material and form a solution therein, an outlet in the side of each compartment at a point above the half-way mark but below the top thereof, a standpipe arranged substantially vertically in each compartment each standpipe having an inlet at its upper end and a plurality of jet apertures at its lower end said jet apertures being adjacent the bottom of said compartment, each of said outlets, and inlets and said pipe-manifolds having means for detachably connecting a conduit thereto, and a conduit complex independent of said tank but adapted to be connected thereto, said complex comprising a flexible conduit detachably connected, respectively, to the pipe-manifold of each compartment, to the outlet in the side thereof and to the inlet in the top of its respective standpipe, a discharge conduit, pumping-means arranged to pump said solution through the conduits of said conduit complex into and from the respective compartments of said tank, and valves in said flexible conduits arranged to be operated in predetermined sequence to cycle said solution through said conduits first from the side outlet of a compartment into the bottom opening thereof via its pipe-manifold, then to recycle the solution from within the said compartment to the inlet at the top of its standpipe via its pipe-manifold and thereafter to discharge the solution from the said compartment via its pipe-manifold and discharge conduit.

6. A method for unloading substantially dry pulverulent titanium dioxide contained in a transportable tank comprising the steps of: injecting a liquid into the bottom of said tank via an inlet in an amount to produce a $TiO_2$ slurry of predetermined solid content, closing said inlet, and mixing said liquid with said pulverulent titanium dioxide to form a homogeneous slurry by first withdrawing a relatively dilute $TiO_2$ slurry from said tank at a point above the half-way mark thereof and injecting said dilute slurry into the bottom of said tank in a continuous cyclic operation, thereafter withdrawing a more concentrated $TiO_2$ slurry from the bottom of said tank and injecting it into the top of said tank in a continuous recycle operation to form a homogeneous $TiO_2$ slurry in said tank and then unloading the homogeneous $TiO_2$ slurry from said tank by discharging it from the bottom thereof.

7. A method for unloading substantially dry pulverulent titanium dioxide according to claim 6 wherein the $TiO_2$ slurry injected into the top of said tank enters a standpipe therein and is discharged from said standpipe into said tank in the form of radially oriented jet streams.

8. A method for unloading substantially dry pulverulent titanium dioxide according to claim 7 wherein the $TiO_2$ slurry is discharged into said tank as radially oriented jet streams both from the bottom of said standpipe and from an intermediate point between the bottom and top thereof.

References Cited

UNITED STATES PATENTS

| | | | |
|---|---|---|---|
| 2,505,194 | 4/1950 | Loss | 302—14 |
| 3,307,596 | 3/1967 | Stockel et al. | 302—53 |
| 3,338,635 | 8/1967 | Koranda | 302—16 |
| 3,375,942 | 4/1968 | Boram | 302—14 |
| 3,381,831 | 5/1968 | Oka | 302—14 |

ANDRES H. NIELSEN, *Primary Examiner.*